US007194134B2

(12) United States Patent
Bradshaw

(10) Patent No.: US 7,194,134 B2
(45) Date of Patent: Mar. 20, 2007

(54) HIERARCHICAL, PROBABILISTIC, LOCALIZED, SEMANTIC IMAGE CLASSIFIER

(75) Inventor: David Benedict Bradshaw, Cambridge (GB)

(73) Assignee: Microsoft Corporation, Redmond, WA (US)

( * ) Notice: Subject to any disclaimer, the term of this patent is extended or adjusted under 35 U.S.C. 154(b) by 1325 days.

(21) Appl. No.: 09/753,413

(22) Filed: Jan. 2, 2001

(65) Prior Publication Data

US 2002/0122596 A1    Sep. 5, 2002

(51) Int. Cl.
*G06K 9/68* (2006.01)
*G06K 9/70* (2006.01)

(52) U.S. Cl. .................. 382/226; 358/453; 358/538; 382/165; 382/190; 382/305

(58) Field of Classification Search ............... 382/159, 382/162, 227, 240, 305, 165, 190, 224, 226; 707/102; 358/453, 538
See application file for complete search history.

(56) References Cited

U.S. PATENT DOCUMENTS

| | | | | |
|---|---|---|---|---|
| 5,822,452 | A * | 10/1998 | Tarolli et al. | 382/166 |
| 5,872,864 | A * | 2/1999 | Imade et al. | 382/176 |
| 5,995,651 | A * | 11/1999 | Gelenbe et al. | 382/156 |
| 6,317,517 | B1 * | 11/2001 | Lu | 382/228 |
| 6,594,383 | B1 * | 7/2003 | Syeda-Mahmood | 382/162 |
| 6,678,421 | B1 * | 1/2004 | Daniell et al. | 382/240 |
| 6,801,672 | B1 * | 10/2004 | Thomas | 382/275 |
| 6,826,300 | B2 * | 11/2004 | Liu et al. | 382/159 |
| 7,020,330 | B2 * | 3/2006 | Schroder et al. | 382/167 |
| 7,035,467 | B2 * | 4/2006 | Nicponski | 382/224 |
| 7,039,239 | B2 * | 5/2006 | Loui et al. | 382/225 |
| 7,043,474 | B2 * | 5/2006 | Mojsilovic et al. | 707/6 |
| 2002/0122596 | A1 * | 9/2002 | Bradshaw | 382/226 |
| 2005/0105776 | A1 * | 5/2005 | Luo et al. | 382/115 |

OTHER PUBLICATIONS

Serkan Hatipoglu et al, Texture Classification Using Dual-Tree Complex Wavelet Transform, IEEE 1999, p. 344-347.*
Zijun Yang et al, A Semantic Classification and Composite Indexing Approach to Robust Image Retrieval, IEEE 1999, p. 134-138.*
Yu-Ichi Ohta et al, Color Information for Region Segmentation, Computer Graphics and Image Processing, 13, 1980, pp. 222-241.*
Hotta et al., "Image Retrieval by using PCA Binary Trees," Transactions of the Institute of Electronics, Information and Communication Engineers D-11, vol. J83D-11, No. 5, May 2000, pp. 1395-1397.

(Continued)

*Primary Examiner*—Gregory Desire

(57) ABSTRACT

Described herein is a technology for semantically classifying areas of an image (and/or the images themselves) as one of a number of multiple discriminating categories. More particularly, the technology employs one or more hierarchical, probabilistic techniques for performing such classification. Such technology is particularly useful in fields of image classification and image retrieval. The architecture of such technology employs multiple hierarchical layers. The architecture is based on modeling class likelihoods at each of such layers separately and then combining these to form an overall estimate of the posterior, conditioned on the data. The task of combining the estimated class likelihoods at each layer is made more efficient by assuming statistical independence between layers. This abstract itself is not intended to limit the scope of this patent. The scope of the present invention is pointed out in the appending claims.

20 Claims, 5 Drawing Sheets

OTHER PUBLICATIONS

Vasconcelos et al., A Probabilistic Architecture for Content-based Image Retrieval, MIT Media Lab, IEEE 2000, pp. 216-221.

Wu et al., "Discriminant-EM Algorithm with Application to Image Retrieval," Beckman Institute, University of Illinois at Urbana-Champaign, IEEE 2000, pp. 222-227.

Martinez, "Semantic Access of Frontal Face Images: the expression-invariant problem," Robot Vision Lab. School of Electrical and Computer Engineering, Purdue University, IEEE 2000, pp. 55-59.

Durand et al., "Extraction of Composite Visual Objects from Audiovisual Materials," Proceedings of SPIE Conference on Multimedia Storage and Archiving Systems IV, SPIE vol. 3846, Sep. 1999, pp. 194-203.

Puricha et al., "A theory of proximity based clustering: structure detection by optimization," Journal of Pattern Recognition Society 33, 2000, pp. 617-634.

Xu et al., "Object Formation by Learning in Visual Databases Using Hierarchical Content Description," Department of Electrical Engineering, University of Rochester, Xerox Corporation, IEEE, 1999, pp. 595-599.

Fuh et al., "Hierarchical Color Image Region Segmentation for Content-Based Image Retrieval System," IEEE Transactions on Image Processing, 2000, V9, N1 (Jan), pp. 156-162.

Lee et al., "Information Embedding Based on User's Relevance Feedback for Image Retrieval," Proceedings of SPIE Conference on Multimedia Storage and Archiving Systems IV, SPIE vol. 3846, Sep. 1999, pp. 294-304.

\* cited by examiner

Original Image A (300)

Original Image B (400)

High-resolution segmention of Image A (310)

High-resolution segmention of Image B (410)

Quad-tree segmentation of Image A (320)

Quad-tree segmentation of Image B (420)

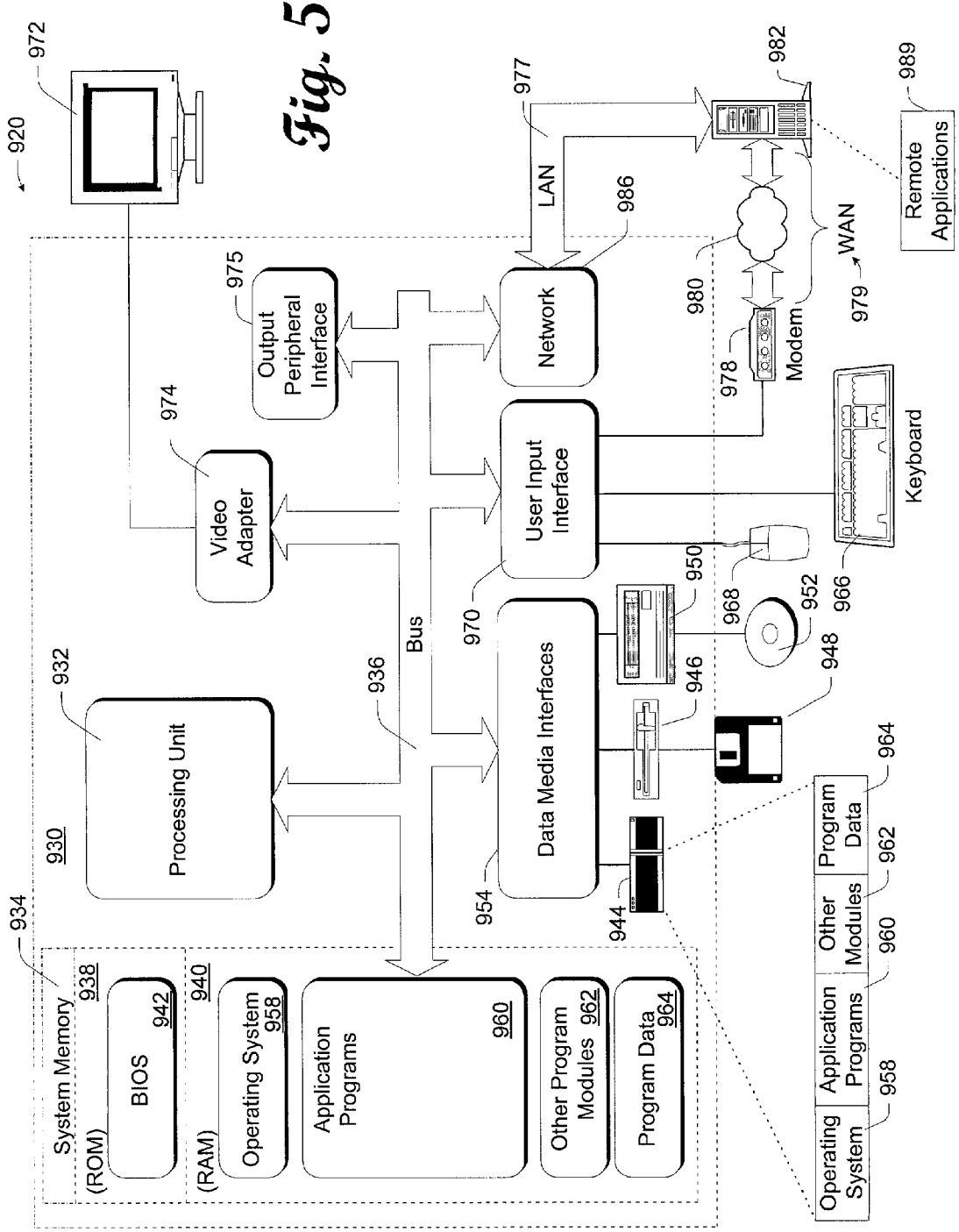

HIERARCHICAL, PROBABILISTIC, LOCALIZED, SEMANTIC IMAGE CLASSIFIER

TECHNICAL FIELD

This invention relates to semantic, content-based classification of localized areas of an image as one of a number of multiple discriminating categories. More particularly, this invention relates to one or more hierarchical, probabilistic techniques for performing such semantic, content-based classification.

BACKGROUND

Digital images are increasingly more common as scanners and digital cameras drop in price and increase in availability and function. As digital photographers (amateurs and professionals alike) amass large collections of digital photographs on their computers, the challenges involved with organizing, querying, and accessing digital images grow.

Therefore, digital photographers need to utilize "image retrieval" technology to accomplish their task. "Image retrieval" refers to a technology focused on the organization of a library of digital images, the inquiry into such a library, and the retrieval of selected images that meet the terms of such inquiry.

Content-Based Categorization Approaches

Images in a library may be organized and, thus, retrieved in an organized fashion based upon their content. This may be accomplished manually or automatically. An approach is manual if one or more persons largely perform the analysis and categorization of images in the library and/or if one or more persons largely browse the images to find those matching a query. An approach is automated if these tasks are chiefly performed by a computer without significant human interaction.

Content-based categorization and image retrieval approaches are beneficial to both professionals and amateurs. Professional digital photographers (or any other digital image acquirers) may have one or more extraordinarily large libraries of images. They need to find the most cost-effective and efficient image retrieval approach available. Similarly, amateur digital photographers wish to minimize time spent organizing and retrieving images in their growing library of digital images.

Manual, Brute-Force, Content-Based Image Retrieval Approach

A person may organize a small library of digital images by manually analyzing, sorting, and categorizing each image into one or several labeled computer file folders (i.e., directories). With this simple brute-force approach, a person views and examines the content of each image. Based upon a manual content-based analyses of an image, an analyzing person places the image into one of several categories.

This technique has at least three major drawbacks:
image classification is highly labor intensive;
image re-classification requires a manual re-examination of the entire library; and
image querying is unavailable.

A re-classification requires a complete repetition of an already completely manual and labor-intensive task. Furthermore, it is a time-consuming and a fully manual task to locate a known image in such a library. A person must view and examine every picture in the library or, at best, every picture in a given category.

To alleviate the problems of re-classification and image querying, some conventional manual approaches associate relevant words with each image. Therefore, the images may be classified and re-classified based upon their associated "index words." In addition, the images may be searched based upon such words. However, querying and any subsequent re-classification are limited to the set of words initially associated with images. Nevertheless, this approach still requires a manual and time-consuming initial image analysis and word-association.

Automated, Content-Based Image Retrieval Approach (CBIR)

Automated, Content-Based Image Retrieval (herein, simply referred to as CBIR) has been actively researched in the last ten years because of the increasingly large volumes of electronically stored information and the corresponding requirement for high performance systems to access and manipulate this information.

Initial conventional CBIR systems (classed herein as first-generation) give a user (such as a professional or amateur user) direct access to the underlying low-level feature space. Examples of such low-level feature spaces include those corresponding to color and/or texture information. Examples of such systems include the IBM Query By Image Content (QBIC) system (M. Flickner, et al. *Intelligent Multimedia Information Retrieval*, p. 8–22. AAAI Press, 1997), the Virage system (A. Gupta and R. Jain, *Communications of the ACM*, 40(5):71–79, May 1997), and the VisualSEEk system (J. Smith and S. Chang. *Intelligent Multimedia Information Retrieval*, p. 23–41. AAAI Press, 1997). Each of these systems allows the user to specify a query in a number of ways based on the features extracted by the system.

The user is also often allowed to specify how much weight to attach to each of these features. However, it is now recognized in the field of image retrieval that this explicit knowledge of the feature space does not help the user formulate a query. Typically, the user simply cannot tell which low-level features, for a given query, are more or less important.

There are a number of conventional CBIR systems (classified herein as second-generation), which deliberately hide the low-level features from the user. Instead of specifying texture and color combinations, the user supplies an example image and asks for similar ones. This task is often called "Query By Example" (QBE).

Although this alleviates the problem of knowing which low-level features are important for a given query it immediately introduces another one. Namely, the user must already have a good example of what the user wants prior to initiating the query. Examples of such systems are the "texture of textures" system devised by Debonet and Viola (J. S. DeBonet. Novel statistical multiresolution techniques for image synthesis, discrimination, and recognition. Master's thesis, M.I.T. Learning and Vision Group, AI Lab, 1997) and the system developed by Rui et al. at the University of Illinois.

Image Feature Space

Examples of an image feature space include a low-level image feature space and a higher-level semantic image feature space. A point in an image feature space may be referred to as a "feature", a "feature vector", or a "vector."

Any image feature space of an image includes observable and measurable characteristics of the content of such an image.

Low-level image feature spaces include basic observable and measurable characteristics having little or no semantic value. Herein, a point within a low-level image feature space may be referred to as a "low-level feature", a "low-level feature vector", or a "low-level vector."

Color and texture are examples of low-level features. Typically, the colors and textures of an image's content have little or no meaning themselves. Rather, objects depicted in the image by a complex combination of colors and textures have meaning. For example, a person is probably more interested in locating images of their "home" than images of "tan-brown block with raised shadow stripes at an angle of 20–55 degrees with a surrounding wash of green with spots of brown."

A higher-level semantic image feature space includes observable and measurable characteristics with semantic value (i.e., meaning). Such higher-level features may be constructed using supervised learning techniques (such as the Kernel Fisher discriminant) in association with sets of extracted low-level features. Herein, a point within a higher-level semantic image feature space may also be referred to as a "higher-level feature", a "higher-level feature vector", a "higher-level vector", "semantic feature", "semantic vector", and the like.

Typically, conventional systems use low-level image feature space for indexing.

Semantic Content Extraction

There are a number of publications that address the issue of extracting semantic content from images. One of the first was Gorkani and Picard (Texture orientation for sorting photos "at a glance". In *Proc. of the IEEE Int. Conf. on Pattern Recognition*, October 1994), who attempt to discriminate "city" from "landscape" scenes using a texture orientation approach that is based on a multi-scale steerable pyramid operating on 128×128 pixel blocks across an image. Yiu (Image classifier using color cues and texture orientation. Master's thesis, Dept EECS, MIT, 1996) uses an identical texture extraction approach but introduces color information to classify indoor and outdoor scenes. The procedure used is based on a nearest neighbor approach combined with a support vector machine classifier.

Gorkani and Picard use one block size (e.g., 128×128) and extract orientations at multiple-frequency-scales to give them a discriminant. Their system was developed for use on black & white photos; thus, it does not include color information. Moreover, their system is non-probabilistic; rather, it uses a number of hand-tuned threshold parameters to perform the classification.

Szummer and Picard (Indoor-outdoor image classifier. In *IEEE Int. Work. on Content-based Access of Image and Vid. Databases*, January 1998) address the same problem but combine a number of feature extraction techniques. An example of such a combination of techniques includes a combination of Ohta color space histograms (see Y. Ohta, T. Kanade, and T. Sakai. Color information for region segmentation. *Computer Graphics and Image Processing*, 13:222–241, 1980) and textural features based on a multi-resolution simultaneous autoregressive model (see J. Mao and A. Jain. Texture classification and segmentation using multiresolution simultaneous autoregressive models. *Pat. Rec.*, 25(2):173–188, 1992).

None of the conventional approaches described above are hierarchical. Instead, they only analyze the image at one block size (the 'multi-scale' description indicates that the textures are extracted across a number of different frequency scales). Moreover, none of these systems are probabilistic. To perform the classification the first conventional system (Gorkani and Picard) uses a number of hand-tuned threshold parameters, the second conventional system (Szummer and Picard) uses a k-nearest neighbors approach, and the third conventional system (Yiu) uses a support vector machine classifier.

In addition, Torralba and Oliva (A. B. Torralba and A. Oliva. Semantic organization of scenes using discriminant structural templates. In *ICCV"99*, Corfu, Greece, September 1999) address the issue of extracting semantic content from images. They attempt to determine a set of real-valued "semantic axes" in their chosen feature space. While they assign real-values to each image in relation to each semantic label rather than the more common binary classification approach, they do not extend these real-values to a probabilistic representation. The three axes chosen are: "Natural/Man-made", "Open/Closed" (on the subset of natural images) and "Expanded/Enclosed" (on the sub-set of man-made images). The Torralba and Oliva system only outputs one real value per image which itself is non-probabilistic.

Statistical Representation of Features

Within images, textures and other low-level features may be represented by statistical properties. Such statistical properties are often used in the field of object-recognition. The following publications provide good background in the area of statistical representation of texture features:

- DeBonet and Viola (Multiresolution sampling procedure for analysis and synthesis of texture images. In *SIGGRAPH"97*, pp. 361–368, 1997);
- Heeger and Bergen (Pyramid-based texture analysis/synthesis. In *SIGGRAPH"95*, pp. 229–238, 1995);
- Zhu, Wu and Mumford (Filters, random fields and maximum entropy. *Int. Journal of Computer Vision*, 27(2): 1–20, March/April 1998);
- Wiskott et al. (Face recognition by elastic bunch graph matching. In *IEEE Int. Conf on Image Processing*, v. 1, 1997); and
- Rikert et al. (A cluster-based statistical model for object detection. In *ICCV"99*, 1999).

The majority of the techniques covered in the above publications analyzes and extract texture from an image over a number of scales at a given position in the image.

Conventional Systems Using Semantic Representations

Presently, three conventional systems attempt to infer semantic representations.

The first by Vailaya et al. categorizes 'vacation images' using a Bayesian framework (A. Vailaya, M. Figueiredo, A. K. Jain, and H J ZHang. Content-based hierarchical classification of vacation images. In *IEEE Conf on Multimedia Computing and Systems*, v. 1, p. 518–523, 1999).

The second system by Fung and Loe is non-probabilistic, analyzing 'natural scenes' (C. Y. Fung and K. F. Loe. A new approach for image classifier and retrieval. In *22nd SIGIR Int. Conf on Research and Development in Information Retrieval*, p. 301–302, August 1999) and categorizing them into classes such as "rural", "forest", "road" and "farm".

The third system by Liu et al. classifies only medical images using a probabilistic, feature selection method (Y Liu, F. Dallaert and W. E. Rothfus. Classification Driven Semantic Based Medical Image Indexing and Retrieval, Technical Report: CMU-RI-TR-98-25, Carnegie Mellon University, 1998). Note that the latter two are only applicable to restricted domains (the former being 'natural scenes' and the latter being 'medical images').

The Vailaya et al. approach is a non-localized, non-hierarchical, probabilistic system. There are at least three disadvantages of the Vailaya et al. approach. Firstly, it requires thousands of images to train properly. This is because their proposed system performs probability density estimation using a vector quantization approach, which means that densities are estimated in the feature vector space. If, for example, twelve dimensional feature vectors are used, Vailaya et al. estimates the class conditional densities in that twelve dimensional space. Secondly, it only generates one value per image (thus, not localized results). Thirdly, the computational complexity of both training and testing is high. Vailaya et al. approach uses LUV and HSV color decompositions to extract color low-level features. It also uses multi-resolution, simultaneous auto-regressive approach to extract texture features.

The Fung and Loe approach is a non-probabilistic, non-localized, non-hierarchical system. A disadvantage of the Fung and Loe approach is that it obtains a single overall result for a given image by analyzing data extracted from 32×32 pixel sized patches. Another disadvantage of their approach is that they use a clustering, non-probabilistic approach to classify the patches that requires many thousands of images to train. A classification for the entire image is then determined using a singular value decomposition technique operating on a feature vector whose dimensions correspond to the results obtained from each of the patches. The Fung and Loe system uses an LUV color decomposition, extracting the mean and variance of these patches to use in the image feature space.

The Liu et al. method is a non-localized approach to classifying medical images of the brain. It is probabilistic, in nature, using a Bayesian approach to select which dimensions of the image feature space are best suited to a given semantic classification task. As mentioned earlier, the technique is domain specific in that it is only applicable in the medical imaging domain.

SUMMARY

Described herein is a technology for semantically classifying areas of an image (and/or the images themselves) as one of a number of multiple discriminating categories. More particularly, the technology employs one or more hierarchical, probabilistic techniques for performing such classification. Such technology is particularly useful in fields of image classification and image retrieval.

The architecture of such technology employs multiple hierarchical layers. The architecture is based on modeling class likelihoods at each of such layers separately and then combining these to form an overall estimate of the posterior, conditioned on the data. The task of combining the results across layers is made more computationally efficient by assuming statistical independence between layers.

This summary itself is not intended to limit the scope of this patent. Moreover, the title of this patent is not intended to limit the scope of this patent. For a better understanding of the present invention, please see the following detailed description and appending claims, taken in conjunction with the accompanying drawings. The scope of the present invention is pointed out in the appending claims.

BRIEF DESCRIPTION OF THE DRAWINGS

The same numbers are used throughout the drawings to reference like elements and features.

FIG. 5 is an example of a computing operating environment capable of implementing an implementation of a hierarchical, probabilistic, localized, semantic image classifier.

DETAILED DESCRIPTION

Figure 1:
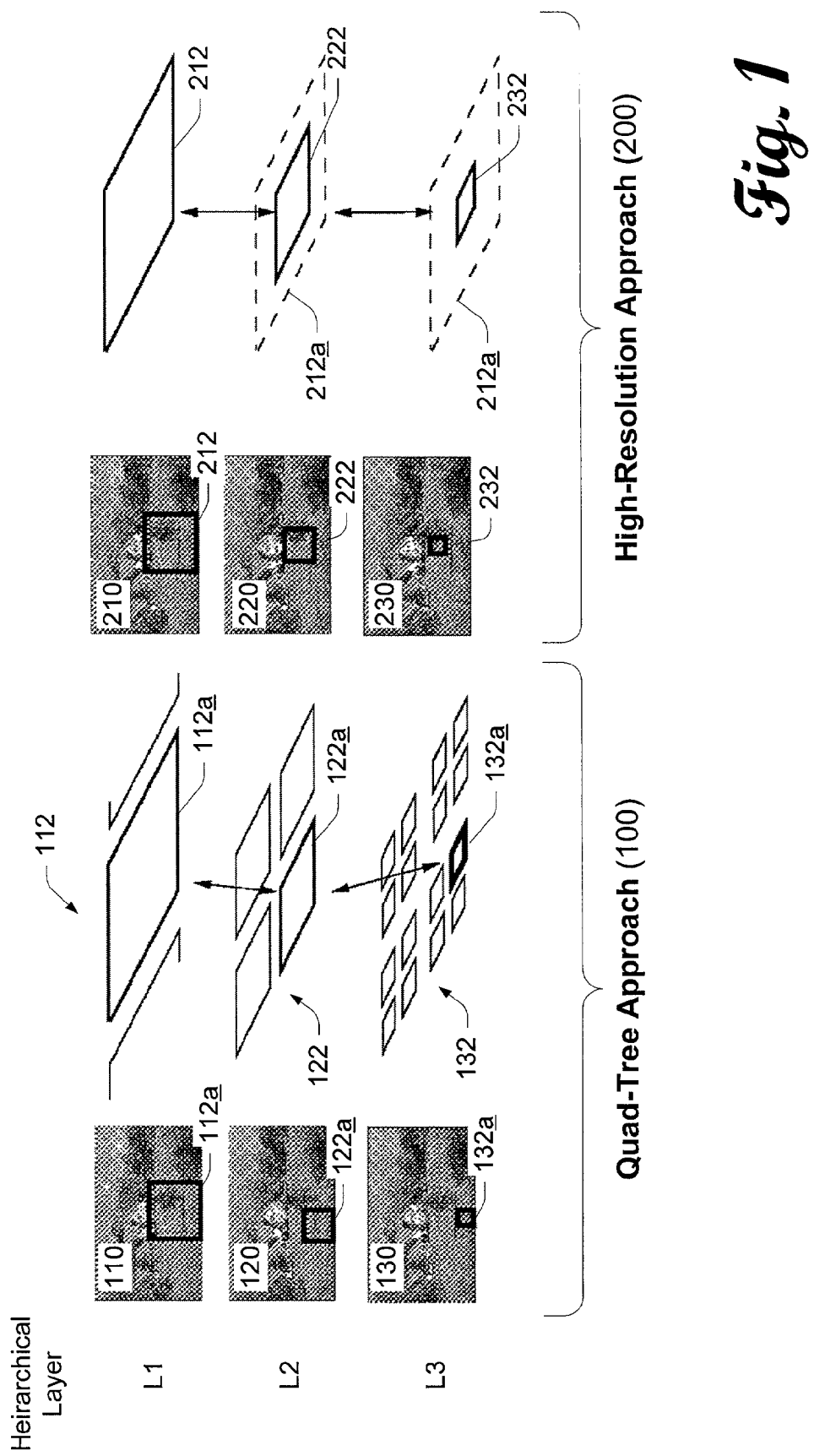
FIG. 1 is a two-part diagram illustrating the operation of the quad-tree and the high-resolution approaches of an implementation of a hierarchical, probabilistic, localized, semantic image classifier.

The following description sets forth specific embodiments of the hierarchical, probabilistic, localized, semantic image classifier that incorporate elements recited in the appended claims. These embodiments are described with specificity in order to meet statutory written description, enablement, and best-mode requirements. However, the description itself is not intended to limit the scope of this patent.

Described herein are one or more exemplary implementations of the hierarchical, probabilistic, localized, semantic image classifier. The inventor intends these exemplary implementations to be examples. The inventor does not intend these exemplary implementations to limit the scope of the claimed present invention. Rather, the inventor has contemplated that the claimed present invention might also be embodied and implemented in other ways, in conjunction with other present or future technologies.

Introduction

Described herein are one or more exemplary implementations of a hierarchical, probabilistic, localized, semantic image classifier. One of such exemplary implementations may be may be referred to as an exemplary "semantic image classifier." The exemplary semantic image classifier employs a probabilistic approach to semantic labeling localized portions of an image.

With the semantic image classifier, the labels (i.e., classification or categories) that are extracted from an image may be one of a number of multiple discriminating categories. For example, areas of an image (or the images as a whole) can be labeled as either "man-made" or "natural" objects. Alternative categories may include "indoor" or "outdoor"; "sky" or "not sky"; "grass" or "not grass"; and other such discriminating classifications. The classifications provided herein are examples and not limitations on the classifications available.

The image classification is beneficial for indexing images based on their semantic content. In other words, images are indexed based upon a higher-order meaning of their content (e.g., "building", "sky", "indoor" or "outdoor") rather than a low-level observation of their content (e.g., "red", "green", "smooth gradient").

In the exemplary classifier described herein, a hierarchical framework is utilized. Such a framework includes a hierarchy of levels (i.e., layers). At each of the layers in a hierarchy, class likelihood probability densities are estimated. These are then combined to form a posterior estimate of the probability of class membership based on the evidence across layers.

The exemplary image classifier accurately generates localized semantic labels (in a probabilistic setting). Specifically, the exemplary image classifier addresses the problem of probabilistically labeling images, or parts of images, as being made up of man-made (e.g. buildings, roads, cars) or natural (e.g. clouds, forests, streams) objects. Furthermore, the exemplary classifier may address other similar problems, such as the problem of determining whether an image was taken inside or outside.

With the exemplary image classifier, semantics can be probabilistically assigned to different areas of an image without having to resort to 3-D reconstruction, point correspondences, or structure from motion techniques normally associated with the conventional techniques, such as in the computer vision community. Furthermore, the exemplary semantic image classifier does not require a person to hand-segment hundreds of images on a pixel-by-pixel basis.

Overview of the Exemplary Semantic Image Classifier

Again, the exemplary semantic image classifier employs a multi-layer (i.e., hierarchy) architecture, which allows a localized approach to the semantic labeling of images (or areas of an image).

To accomplish this labeling, the exemplary semantic image classifier aggregates data over a number of different layers, each layer being a different block size. The classifier combines the knowledge obtained from each of these layers. This gives rise to a significantly more robust technique than a conventional single layer approach.

With reference to FIG. 1, implementations of an exemplary image classifier are described. FIG. 1 illustrates a quad-tree implementation (100) and a high-resolution implementation (200). FIG. 1 includes a common image shown six times in FIG. 1 as images 110, 120, 130, 210, 220, and 230. Each illustrated image in FIG. 1 is identical to the others except for a block depicted thereon. Therefore, references to the "common image" are to the same image shown six times (images 110, 120, 130, 210, 220, and 230) in FIG. 1. These images are from "Corel™ Gallery 1,000,000" collection.

The exemplary image classifier is called hierarchical because it divides and analyses successive hierarchical layers (i.e., levels) of an image where each layer consists of smaller blocks than the previous layer. For example, the exemplary image classifier may use three layers.

At a top layer (L1 in FIG. 1), an image (such as image 110) is divided into multiple large blocks (such as blocks 112). These blocks may be generically called L1-blocks. Such blocks may be of a large size, such as 128×128 pixels. Block 112a is shown where it appears on image 110 and in bold lines at 112a in the hierarchical layer L1.

In the next layer (L2 in FIG. 1), one or more smaller blocks (such as block 122a of blocks 122) are coextensive with a portion of and associated with a large block (such as block 112a of blocks 112) of the common image. These blocks may be generically called L2-blocks. Such blocks are of a size smaller than L1-block. For example, the L2 blocks may be 64×64 pixels while the L1-blocks were 128×128 pixels. Block 122a is shown where it appears on image 120 and in bold lines at 122a in the hierarchical layer L2.

In the final layer (L3 in FIG. 1) of this example, one or more even smaller blocks (such as block 132a of blocks 132) are coextensive with a portion of and associated with a small block (such as block 122a of blocks 122) of the common image. Therefore, these tiny blocks are coextensive with a portion of and associated with a large block (such as block 112a of blocks 112) of the common image. These tiny blocks may be generically called L3-blocks. Such blocks are of a size smaller than L2-block. For example, the L3 blocks may be 32×32 pixels while the L2-blocks were 64×64 pixels. Block 132a is shown where it appears on image 130 and in bold lines at 132a in the hieratical layer L3.

Although not shown in FIG. 1, successively lower layers (L4, L5, etc.) may continue forth with their accompanying smaller block sizes. The blocks of each successively lower layers will be coextensive with a portion of and associated with a block of the upper layers. After a hierarchy of layers is established, it is a implementation choice regarding how many layers to employ.

The probabilistic analysis for each block is based upon extracting feature vectors (such as color and texture) using known image processing (e.g., computer vision, machine learning) techniques. The probabilistic determination for each block is based upon a known classification technique called "Kernel Fisher's discriminant."

Supervised Learning Techniques for Discriminating Between Classes

Given a classification problem involving two or more classes (such as Natural vs Man-made), Fisher's linear discriminant aims to achieve an optimal linear dimensionality reduction which then allows a discriminant to be determined. The following reference describes Fisher's linear discriminant: Bishop (Neural Networks for Pattern Recognition, Oxford University Press, 1995). Although Fisher's linear discriminant works well for linearly separable problems it cannot classify when the problem at hand is non-linearly separable.

The Kernel Fisher discriminant, although computationally more intensive, can separate classes which are non-linearly separable and hence allows a much wider range of problems to be solved. The following references describe Kernel Fisher discriminant: Mika et al. (Fisher discriminant analysis with kernels, *Neural Networks for Signal Processing IX* pages 41–48, IEEE, 1999); and Roth et al. (Nonlinear discriminant analysis using kernel functions, *Advances in Neural Information Processing Systems* 12 MIT Press, 2000).

Accordingly, the Kernel Fisher discriminant is utilized for implementations of the exemplary image classifier described herein.

Assumption of Statistical Independence Between Layers

It is assumed that the class likelihoods (i.e., probabilities) at each layer are statistically independent of each other. Although there is an actual statistical dependence because the blocks of each layer are contiguous and/or neighboring, the exemplary image classifier assumes no dependence. This makes the calculations easier and for a relatively small training data, produces better results.

One reason why this assumption is made in the exemplary image classifier is that the data required to estimate the class likelihood need only be extracted from homogeneous images. Herein, "homogeneous" refers to scenes that only contain one class of image data (e.g., in the natural/man-made case, the image consists of completely natural or completely man-made objects), whereas "heterogeneous" refers to scenes containing both classes.

If statistical independence is not assumed, then the data used to estimate class likelihood probability densities would have to be extracted from not only homogeneous images but also heterogeneous images. The task of hand segmenting hundreds of images on a pixel-by-pixel basis is extremely time-consuming whereas selecting sets of images that completely consist of data from one class or another is very simple. Heterogeneous examples are beneficial because otherwise the extracted samples would only lie in those areas of the multidimensional feature space corresponding to data that is homogeneous across all layers.

The curse of dimensionality. To generate the same density of examples in the multidimensional feature space as that found in the one-dimensional case requires an increase in the number of examples that is exponential with respect to the increase in dimensionality. Given that 120 images are used in the exemplary image classifier, the required increase in examples would be extremely large. In practice, even a tenfold increase to 1200 images is extremely laborious to find and, given the reason outlined above, even more difficult to hand-segment.

Those of ordinary skill in the art may have difficulty accepting this assumption because it is an approximation. In reality, each layer is statistically dependent upon the others because each layer includes some or all of the pixels found in layers above and/or below in the hierarchy. Although this is an approximation, it is a justified approximation.

Furthermore, it is assumed that a classified object is larger than the smallest block size (or the lowest layer). Because of this implicit smoothness constraint, the hierarchical approach of the exemplary semantic image classifier is unlikely to correctly label particularly small objects of either class. A small object is one that is smaller than the smallest block size (e.g., objects less than 16×16 pixels in size).

Two Approaches: Quad-Tree and High-Resolution

Described herein are two approaches to image classification utilizing the exemplary image classifier: "quad-tree" and "high-resolution" approaches.

Quad-Tree Approach

This approach is faster (than the high-resolution approach) because it requires less computational processing because each pixel is analyzed only once within each layer. However, the results are coarse and less detailed than the high-resolution approach.

The quad-tree approach 100 is illustrated in FIG. 1. An image (such as the image shown at 110, 120, and 130) is divided into adjacent, tiled L1-blocks (such as blocks 112). Each L1-block (such as block 112a) is divided into adjacent, tiled L2-blocks (such as blocks 122). Each L2-block (such as block 122a) is further divided into adjacent, tiled L3-blocks (such as blocks 132). Although not shown in FIG. 1, each L3-block (such as block 132a) is still further divided into adjacent, tiled blocks. And so forth.

In the quad-tree approach, each layer has a different block size. The block sizes decrease from L1 to L3. The blocks are arranged in a non-overlapping, quad-tree structure.

Table 1 defines four layers (L1–L4) and block sizes for an exemplary classifier using the quad-tree approach. For this example, all images used are either 256×384 pixels or 384×256 pixels in size, and have been extracted from the "Corel ™ Gallery 1,000,000" collection.

TABLE 1

Definition of layers and block sizes.

| Layer | Block Size | Blocks per image |
|-------|------------|------------------|
| L1    | 128 × 128  | 6                |
| L2    | 64 × 64    | 24               |
| L3    | 32 × 32    | 96               |
| L4    | 16 × 16    | 384              |

This approach is called quad-tree because each subsequent layer of the hierarchy is equally divided into four (hence, "quad") blocks. Thus, there are four branches from each layer. Of course, those of ordinary skill in the art understand and appreciate that this is only one example of how to sub-divide a block at each layer of a hierarchy. Those of ordinary skill in the art further understand and appreciate that a block at a layer may be divided into any number of sub-blocks (equally or unequally divided) for the next layer.

High-Resolution Approach

Unlike the quad-tree approach, there is one block per layer for each set of associated blocks and each block is centered on a common pixel (i.e., point). Therefore, each block at each layer are likely to overlap with one or more other blocks at the same layer.

In the high-resolution approach, the exemplary image classifier analyzes the image at a number of points, which are distributed across the image. Typically, the points will be equally distributed across the image. These points may be called "sampling points."

The high-resolution approach 200 is illustrated in FIG. 1. A series of overlapping L1-blocks (an example of one L1-block is 212) is formed over an image (such as the image shown at 210, 220, and 230). Each L1-block is centered on its own sampling point (i.e., pixel). Image 210 shows the location and relative size of L1-block 212. By way of example, an L-1 block may be 128×128 pixels.

Each L1-block overlaps its neighboring L1-blocks by a given number of pixels. That number is an implementation choice to balance redundant processing with smoother results. The degree of overlap is directly proportional to the increase in computation because of reprocessing common pixels in multiple L1-blocks.

Each L1-block (such as block 212) has one L2-block (such as block 222) associated therewith. Each L2-block is centered on the same sampling point as its associated L1-block (shown in dashed lines as block 212a). Image 220 shows the location and relative size of L2-block 222. By way of example, an L2-block may be 64×64 pixels.

Similarly, Each L2-block (such as block 222) has one L3-block (such as block 232) associated therewith. Each L3-block is centered on the same sampling point as its associated L2-block, which in turn is centered on the same sampling point as its associated L1-block (shown in dashed lines as block 212a). Image 230 shows the location and relative size of L3-block 232. By way of example, an L3-block may be 32×32 pixels.

This pattern continues for blocks at subsequently lower layers until the lowest layer and smallest block is reach. The choice of the lowest layer and smallest block is a design choice for each implementation. Nevertheless, all of the layered blocks in a set of hierarchical associated blocks are centered on a common pixel, this being one of the sampling points mentioned previously. Moreover, for each sampling point, there is a set of hierarchical associated blocks.

Training

For both approaches, in order to obtain probabilistic labels, probability densities representing the class likelihoods are estimated at each layer. In other words, a set of training images is used to calculate class likelihoods.

To achieve this, a set of feature vectors is obtained for each class (for example, the natural/man-made categorization may be considered) at each layer (i.e., each block size) for images in the training set. This is done by selecting a set of natural and a set of man-made homogeneous images from which feature vectors can be extracted. A different and appropriate training set is used for different discriminating categories (such as inside/outside). Having obtained a set of example feature vectors for each class at each block size the kernel Fisher's discriminant method is used which then allows class conditional densities to be estimated. This is explained later, in the 'Probabilistic Labeling Technique' section.

Both Approaches

With both approaches, all associated blocks are analyzed in the same manner. More specifically, each block is analyzed to probabilistically determine whether the image data in a block contains one of two discriminating categories of objects (e.g., either man-made object or natural object). The probabilities obtained from the associated blocks are then combined to form an estimate of the posterior probability of class membership. This posterior estimate is compared to a given threshold to determine which of the two discriminating categories the image data corresponds to. This is explained later, in the 'Probabilistic Labeling Technique' section. In the case of the quad-tree approach, this result is used to label the smallest block (e.g., the block at L3). In the case of the high-resolution approach, it is used to label the area surrounding the common pixel (i.e., sample point) on which the associated blocks are centered.

Figure 2:
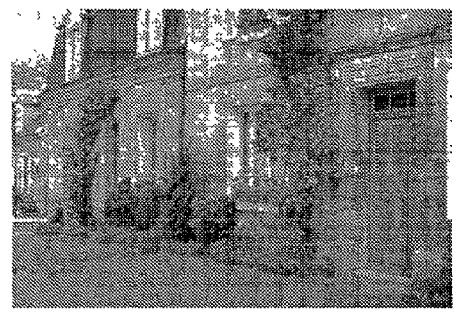
FIG. 2 shows two original images and the same images after segmentation classification performed by the quad-tree and the high-resolution approaches of an implementation of a hierarchical, probabilistic, localized, semantic image classifier.
Figure 2:
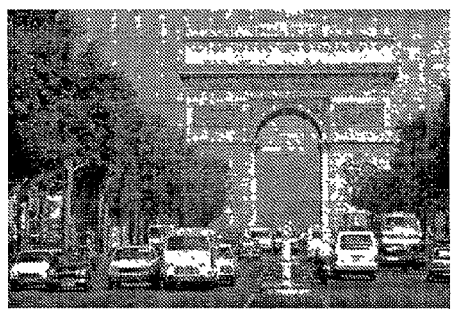
Figure 2:
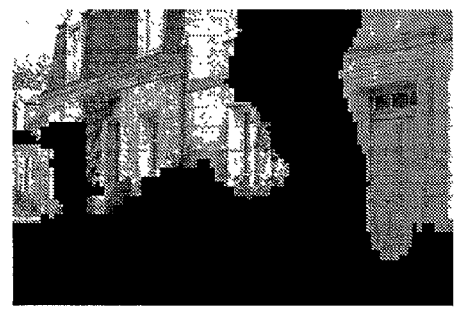
Figure 2:
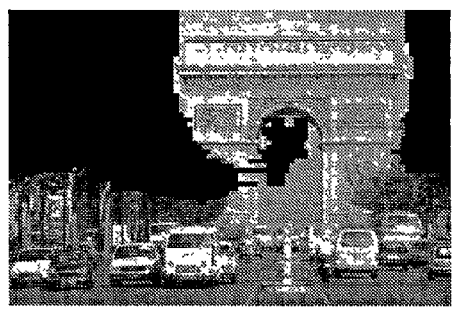
Figure 2:
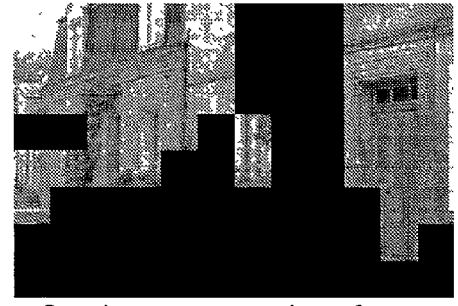
Figure 2:
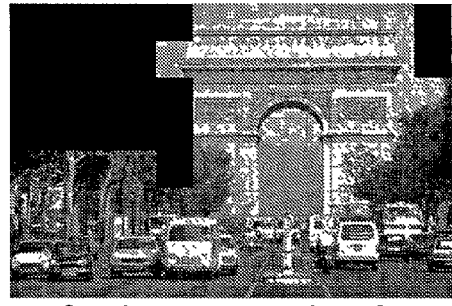

FIG. 2 illustrates the results of each approach. FIG. 2 shows two different original images A (300) and B (400). This shows the segmentation of the images into either the man-made or natural class.

310 and 410 illustrate the segmentation results of the exemplary image classifier using the high-resolution approach for images A and B, respectively. In 310 and 410, the darkened areas are classified as natural and the remaining areas are classified as man-made.

320 and 420 illustrate the segmentation results of the exemplary image classifier using the quad-tree approach for images A and B, respectively. In 320 and 420, the darkened areas are classified as natural and the remaining areas are classified as man-made.

FIG. 2 illustrates that the high-resolution approach generally provides smoother and mare accurate segmentations than the quad-tree approach. Although it cannot be shown in the results, the quad-tree approach is computationally more efficient than the high-resolution approach.

Extracting Feature Vectors

The feature vectors have twenty-six dimensions. To make the task of estimating probability densities easier, dimensionality reduction is performed and then class likelihood densities estimated. Once class probability distributions have been determined, labeling of an image can be performed, first by extracting the image feature vectors from all blocks at all layers. Class likelihoods are then estimated allowing posterior probabilities, conditioned on the data across layers, to be determined by using Bayes rule.

There are two primary feature vectors: color and texture. These low-level features are extracted from images. These features are utilized by the exemplary image classifier to produce semantic level features.

The following discussion focuses on extracting feature vectors in the context of the quad-tree approach. However, those of ordinary skill in the art understand that the high-resolution approach uses the same or similar feature extraction techniques.

The domain of the image is denoted as D and the area over which a block extends is denoted as B where $B \subset D$. The quad-tree parent of this block is now defined as Q(B). The quad-tree decomposition is recursive in nature such that at a given layer l (the letter L) in the decomposition:

$$Q_l(B) = Q(Q_{l+1}(B)) \quad (1)$$

To aid clarity, in the following text a block at layer l is denoted as $B_l$ where:

$$B_l = Q_l(B) \quad (2)$$

This decomposition approach can be seen in the quad-tree approach 100 of FIG. 1. The index l in the quad-tree definition corresponds to the layer (L1, L2, L3, etc.) in the hierarchy as defined in Table 1. At each layer, feature vectors from blocks $B_1$, $B_2$, $B_3$ . . . are extracted. After dimensionality reduction, the likelihood of class membership can be estimated.

Color Extraction

There are many different models available for low-level color extraction. The primary aim when extracting color is to obtain a set of values, which are as de-correlated from each other as possible. Two common models used to achieve this are the Ohta color model (see Ohta referenced in the background section) and the HSV color model (Hue, Saturation and Value). On comparing these methods, it is found that both the Ohta and HSV components had very similar correlation properties with both sets of components being significantly more de-correlated than those of the RGB (Red, Green, Blue) model did. Although they both give very similar results, the Ohta decomposition (i.e., transformation) is more easily computed than the HSV transformation, and so the former is used with the exemplary semantic image classifier. However, those skilled in the art understand that the latter or any other such color model may be employed in an implementation of an semantic image classifier.

Subsequently, the three components of the Ohta color transformation corresponding to image I are denoted as $I_{o1}$, $I_{o2}$, and $I_{o3}$. The first of these corresponds to the luminance information; the latter two correspond to the chrominance information.

The chrominance information corresponding to block $B_1$ is determined as follows:

$$C_1(B_1) = \int_{B1} I_{o2}(r) dr \quad (3)$$

$$C_2(B_1) = \int_{B1} I_{o3}(r) dr \quad (4)$$

where r denotes a particular pixel position in the image.

Texture Extraction

The low-level texture extraction approach is based on the complex wavelet transform (CWT). The CWT developed by Kingsbury (The dual-tree complex wavelet transform: A new efficient tool for image restoration and enhancement. In *EUSIPCO"98*, v. 1, pp. 319–322. EURASIP, 1998) is an efficient way of implementing a set of critically sampled Gabor-like wavelets. Gabor wavelets/filters have been used by those investigating both semantic content and classification problems. They have also been shown to be similar in nature to the function of simple cells in the primary visual cortex of primates. With the exemplary image classifier, the CWT is used rather than Gabor wavelets because of the significantly reduced computational load.

Gabor-like impulse responses provide directional selectivity with six orientations at each scale. Although the filters may be approximately orthogonal, they do not generally provide statistically independent outputs.

To succinctly represent the proposed procedure, the following notation is introduced:
- the wavelet function at scale s, and orientation $\theta$ is denoted as $\phi_s^\theta$;
- the orientation can take one of six values $\theta=\{15°, 45°, -75°, -45°, -15°\}$;
- the $\theta$ in the following text refers to an index into the vector (e.g., $\theta \in I: \{1 \ldots 6\}$; and
- the "*" symbol denotes the convolution operator.

The response across the luminance image $I_{o1}$, extracted using the Ohta transformation, to each of the wavelet functions is determined as follows:

$$I_s^\theta = I_{o1} * \phi_s^\theta \quad (5)$$

The o1 is dropped to aid clarity. The energy response to the wavelet function at scale s, and orientation $\theta$ is defined for a block $B_1$ as:

$$T_s^\theta(B_1) = \int_{B1} (I_s^\theta(\underline{r}))^2 d\underline{r} \quad (6)$$

For the exemplary image classifier described herein, wavelet functions corresponding to scales 1–4 are used with six orientations at each scales giving rise to twenty-four texture based features per feature vector.

Thus, the feature vectors of the exemplary image classifier have twenty-six dimensions, twenty-four texture features and two color features. Using the terms defined above, the feature vector at a particular block B and layer l is found by concatenating the texture based features with the color based features as follows:

$$X_l^B = [T_1^1(B_1), T_1^2(B_1), \ldots, T_4^6(B_1), C_1(B_1), C_2(B_1)] \quad (7)$$

Probabilistic Labeling Technique

With this exemplary image classifier, there are two classes, which are denoted as $C_k$ where $k \in 1, 2$. For example, in the natural/manmade example, $C_1$ corresponds to natural and $C_2$ corresponds to man-made. Probabilities are denoted as P(•) and probability densities as p(•). To determine posterior estimates of class membership Bayes rule is used. This requires prior probabilities of class membership (denoted as $P(C_k)$), a way of estimating the likelihood of class membership for a given block B at a given layer l (denoted as $P(X_l^B|C_k)$) and a way of combining these likelihood estimates from a number of layers. Estimating the priors, $P(C_k)$, presents no problem. If there is no knowledge about the images to be analyzed, they can be set at 0.5.

Estimating the Class Likelihoods

To determine an estimate of the likelihood of class membership, estimation of class conditional densities for each layer l must be undertaken these densities being denoted as $p(X_l^B|C_k)$. To achieve this density estimation, dimensionality reduction is undertaken through the use of the Kernel Fisher's discriminant technique.

This kernel method initially transforms the feature vectors from layer l into a high dimensional space via a non-linear mapping. It is this non-linear mapping that makes this invention suitable for classifying non-linearly separable data (e.g. sky vs. not sky or face vs. not face). In this invention a Gaussian Radial Basis Function kernel is used to achieve the non-linear mapping, of course, those of ordinary skill in the art understand and appreciate that this is only one choice of a number of possible non-linear mappings.

Once in this high dimensional space a vector is determined in a similar manner to that used in the Fisher's discriminant method (hence the name); this vector is denoted subsequently as $p_l$, this discriminative approach gives the "best" vector $p_l$ onto which to project feature vectors in the sense that the projection maximizes inter-class separation whilst minimizing intra-class distance. This method is based on a number of assumptions regarding the distribution of the feature vectors of each class that those of ordinary skill in the art understand and appreciate.

Dimensionality reduction is performed by projecting the feature vector extracted from block B at layer l (denoted as $X_l^B$) onto $p_l$, thus resulting in a scalar value (i.e. the data is one dimensional). This value is subsequently denoted as $X_l^B$. This makes probability density estimation very easy but throws away information that could otherwise be possibly used to discriminate between two classes.

Having determined sets of projected values from the feature vectors from each class, probability densities for the class likelihoods can be estimated. The likelihoods are modeled using normal distributions because when the dimensionality reduction step is undertaken it approximates to summing a set of independent, random variables and thus the central limit theorem can be invoked. The mean and variance of the one-dimensional normal distributions are then found using the maximum likelihood approach.

Combining Class Likelihoods

As discussed earlier, it is assumed that the likelihoods at each layer are statistically independent of each other when estimating the probability of class membership given data at a number of layers.

In the following discussion, the block index B is dropped to aid clarity. Given that data has been extracted from a number of block sizes, 1 to L, at a given sampling point the posterior conditioned on this data is:

$$P(C_k | X_1, \ldots, X_L) = \frac{P(X_1, \ldots, X_L | C_k)}{P(X_1, \ldots, X_L)} P(C_k) \quad (8)$$

$$\approx \frac{\prod_{l=1}^{L} P(X_l | C_k)}{P(X_1, \ldots, X_L)} P(C_k) \quad (9)$$

The denominator can be evaluated using the chain rule as follows:

$$P(X_1, \ldots, X_L) = P(X_L | X_{L-1}, \ldots, X_1) \ldots P(X_2|X_1)P(X_1) \quad (10)$$

Each factor in this expansion of the denominator can be evaluated by marginalizing over the class variable $C_k$:

$$P(X_l \mid X_{l-1}, \ldots, X_1) = \sum_{k \in 1,2} P(X_l \mid C_k) P(C_k \mid X_{l-1}, \ldots, X_1) \quad (11)$$

Evaluating Equation 10 in a top down, recursive manner: At the top layer (e.g., L1), the class likelihood estimates can be evaluated and the posterior conditioned on the data $X_1$ determined. These results can then be used at layer two (e.g., L2), combined with the class likelihood estimates at this layer to evaluate the relevant factor in the expansion of the denominator as described in Equation 10. Now, the posterior conditioned on the data $\{X_1, X_2\}$ can be determined. This process is repeated until the lowest layer L (e.g., L4) is reached.

A quad-tree decomposition implies that at each level in the hierarchy, the number of samples across an image increases by a factor of four. Estimation of class likelihoods occurring between sampling points is achieved by using bilinear interpolation based on the nearest four sample points available.

Note that in the case considered in these example problems are 2-class problems. This results in the following equation:

$$P(C_1 \mid X_1, \ldots, X_L) = 1 - P(C_2 \mid X_1, \ldots, X_L) \quad (13)$$

To determine whether the sample under consideration belongs to class 1 or class 2 equation 9 is evaluated, if the result is >0.5 the sample is assigned as belonging to class 1 otherwise it is assigned as belonging to class 2 (as illustrated by equation 13).

Although equation 13 is directed to a 2-class problem, multi-class problems may be addressed using the approach described herein.

More on the High Resolution Approach

The high-resolution approach uses a different sampling strategy then the quad-tree approach. Specifically, in the high-resolution approach, the blocks contributing to a sampling point are all centered at the same pixel position. In using this approach, samples can be extracted at any position across the image. An exemplary "grid" may be set to have 4×4 spacing. Unlike the quad-tree approach, blocks in the same layer from adjacent samples will overlap.

Although the high-resolution approach is computationally less efficient than the quad-tree approach, it generally gives superior segmentations to the quad-tree approach.

Exemplary Semantic Image Classification System

Figure 3:
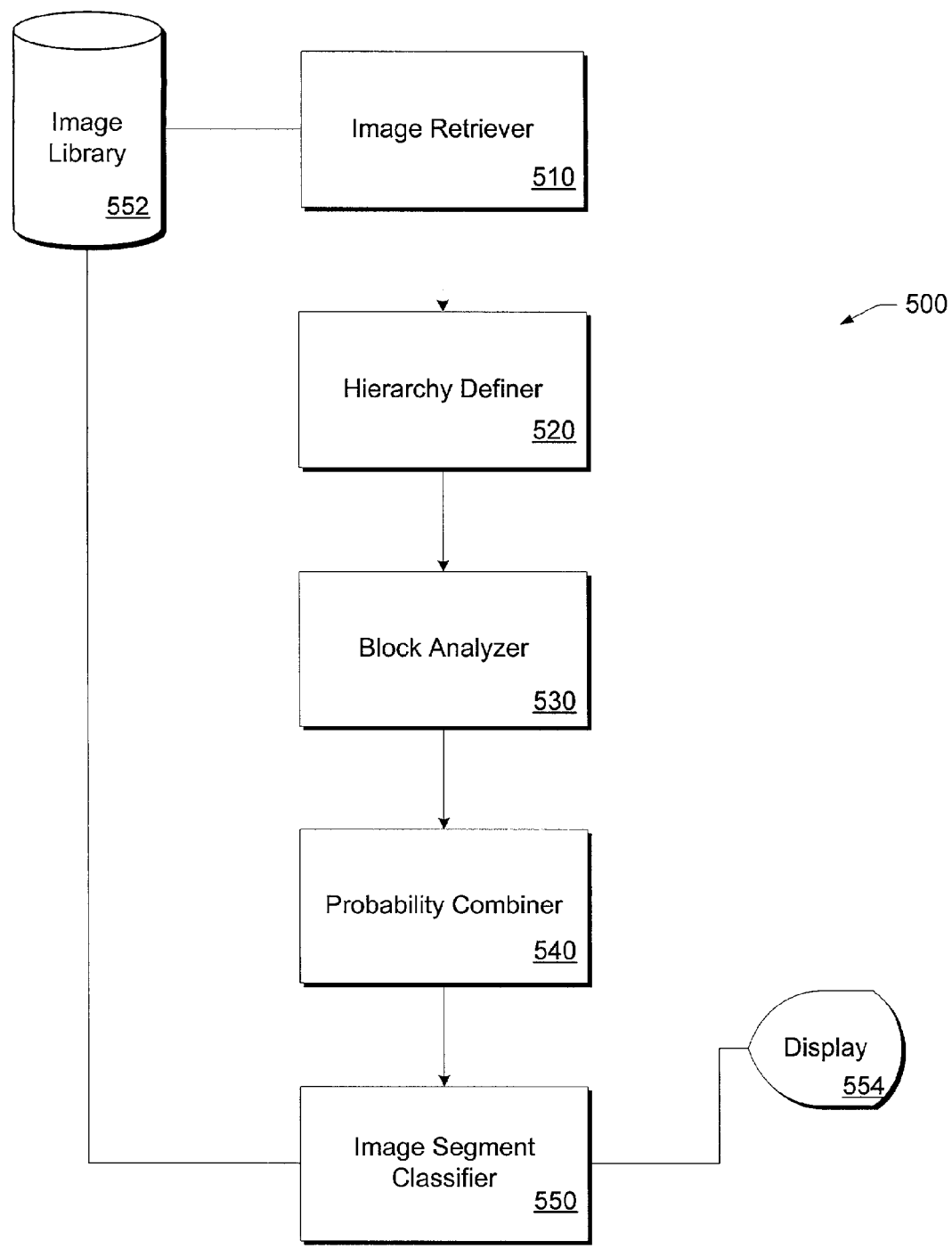
FIG. 3 is a schematic block diagram showing an embodiment of a hierarchical, probabilistic, localized, semantic image classifier.

FIG. 3 shows a semantic image classification system 500, which is an embodiment of the exemplary semantic image classifier. This embodiment may be implemented in software, hardware, or a combination thereof.

This embodiment includes an image retriever 510 for retrieving images from an image library, such as library 552, or some other image source. Once a subject image is chosen, a hierarchy definer 520 selects sampling points across the image. Typically, such sampling points are equally distributed across the image. The definer 520 defines L1-blocks centered on each point. For each of such L1-blocks, it also defines associated hierarchical layers with one or more blocks per layer. The block(s) at each successively lower layer is smaller than and at least partially coextensive with one or more blocks in the layer immediately above.

For the quad-tree approach, each layer (except at L1) is composed of four adjacent, tiled blocks. In effect, the tiled blocks are formed by quartering the block of the layer immediately above. See the quad-tree approach (100) illustrated in FIG. 1.

For the high-resolution approach, each layer is centered on a common sampling point and is composed of only one block. Each block (except at L1) is smaller than the block of the layer immediately above. See the high-resolution approach (200) illustrated in FIG. 1.

After the blocks and the layered hierarchy sets have been defined, a block analyzer 530 analyzes the block(s) of each layer of each set to probabilistically determine whether the image data in a block contains one of two discriminating categories of objects. Such analysis includes the following (which are described in detail above): extracting feature vectors and estimating class likelihoods.

After such analysis, a probability combiner 540 combines the class likelihoods (probabilities) of hierarchical associated blocks. This is done for each set of associated blocks.

After that, an image segment classifier 550 compares the combined probability using equation 9 to determine which of the two discriminating categories the image data of a block corresponds to. The classifier 550 does this for each hierarchical set. The classifier 550 classifies blocks based upon the results of such a comparison. For example, a 16×16 block at layers L4 may be labeled "man-made" or "natural" because the combined probability was above (or below) a given threshold.

Furthermore, the classifier 550 may display the results on display 554 and/or save its results to the image library 552.

For the quad-tree approach, the estimate of class likelihoods occurring between sampling points is achieved by using bilinear interpolation based on the nearest group of sample points available.

When this system processes an entire image, segments (i.e., portions, areas, etc.) of the image will be labeled one of multiple discriminating categories. FIG. 2 shows examples of such segmentation.

Methodological Implementation of the Exemplary Semantic Image Classifier

Figure 4:
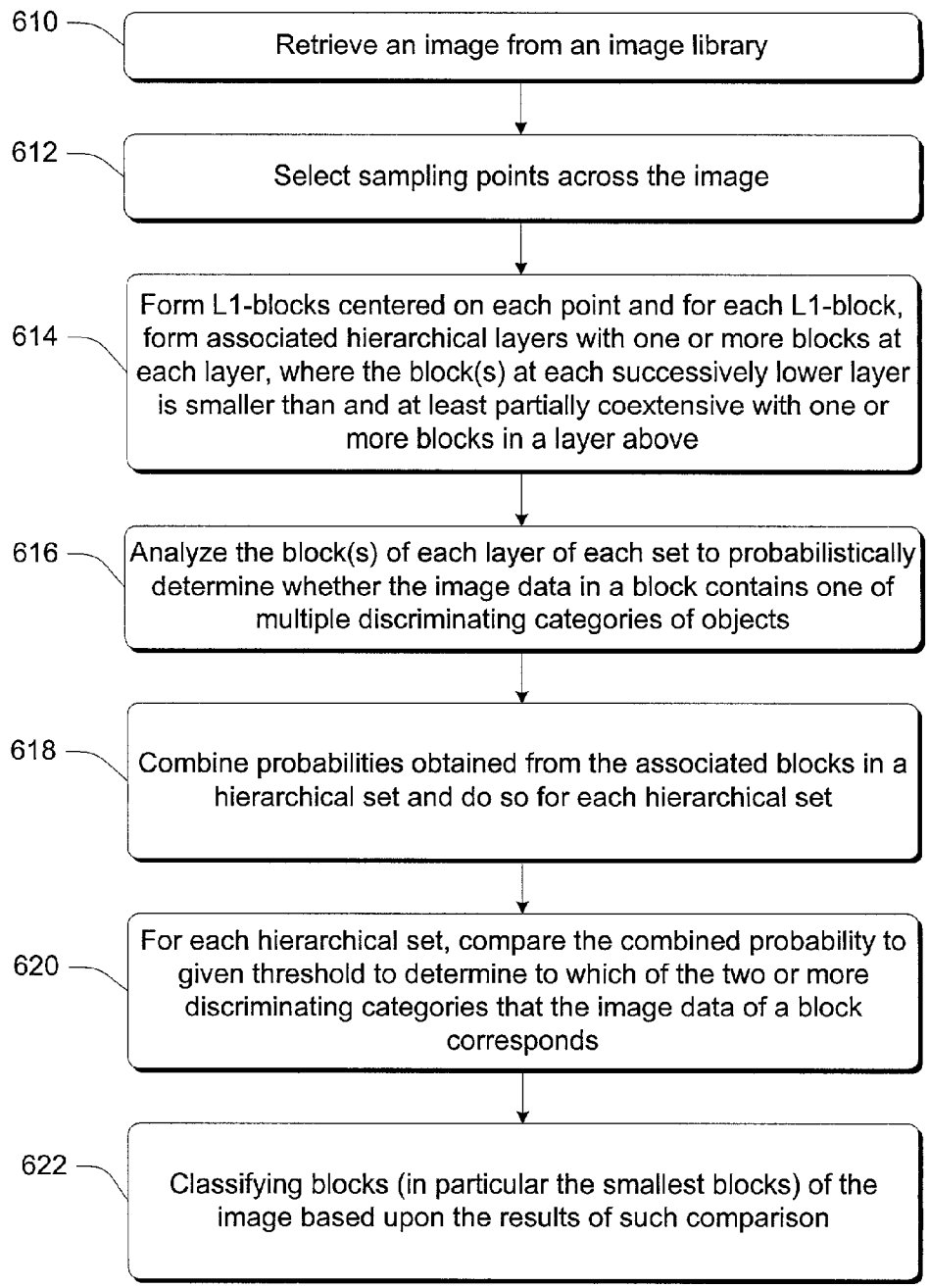
FIG. 4 is a flow diagram showing a methodological implementation of a hierarchical, probabilistic, localized, semantic image classifier.

FIG. 4 shows a methodological implementation of the exemplary semantic image classifier performed by the semantic image classification system 500. This methodological implementation may be performed in software, hardware, or a combination thereof.

At 610 of FIG. 4, the exemplary semantic image classifier retrieves an image from an image library (or from any other source). At 612, it selects sampling points across the image. Typically, such sampling points are equally distributed across the image.

At 614, the exemplary image classifier form L1-blocks centered on each point. For each of such L1-blocks, it also defines associated hierarchical layers with one or more blocks per layer. The block(s) at each successively lower layer is smaller than and at least partially coextensive with one or more blocks in the layer immediately above.

For the quad-tree approach, each layer (except at L1) is composed of four adjacent, tiled blocks. In effect, the tiled blocks are formed by quartering the block of the layer immediately above. See the quad-tree approach (100) illustrated in FIG. 1.

For the high-resolution approach, each layer is centered on a common sampling point and is composed of only one block. Each block (except at L1) is smaller than the block of the layer immediately above. See the high-resolution approach (200) illustrated in FIG. 1.

At 616 of FIG. 4, the exemplary image classifier analyzes the block(s) of each layer of each set to probabilistically determine whether the image data in a block contains one of two discriminating categories of objects. Such analysis includes the following (which are described in detail above): extracting feature vectors (such as color and texture) and estimating class likelihoods.

At 618, the class likelihoods (probabilities) of hierarchical associated blocks are combined. This is done for each set of associated blocks. At 620, for each hierarchical set, the exemplary image classifier compares the combined probability to a given threshold to determine to which of the two discriminating categories that the image data of a block corresponds. In the quad-tree case the estimate of class likelihoods occurring between sampling points is achieved by using bilinear interpolation based on the nearest group of sample points available.

At 622 of FIG. 4, the exemplary image classifier classifies blocks based upon the results of such comparison. For example, a 16×16 block at layers L4 may be labeled "man-made" or "natural" because the combined probability was above (or below) a given threshold.

When this methodological implementation is applied to an entire image, segments (i.e., portions, areas, etc.) of the image will be labeled one of multiple discriminating categories. FIG. 2 shows examples of such segmentation.

Exemplary Computing Environment

FIG. 5 illustrates an example of a suitable computing environment 920 on which an exemplary image classifier may be implemented.

Exemplary computing environment 920 is only one example of a suitable computing environment and is not intended to suggest any limitation as to the scope of use or functionality of an exemplary image classifier. Neither should the computing environment 920 be interpreted as having any dependency or requirement relating to any one or combination of components illustrated in the exemplary computing environment 920.

The exemplary image classifier is operational with numerous other general purpose or special purpose computing system environments or configurations. Examples of well known computing systems, environments, and/or configurations that may be suitable for use with an exemplary image classifier include, but are not limited to, personal computers, server computers, thin clients, thick clients, hand-held or laptop devices, multiprocessor systems, microprocessor-based systems, set top boxes, programmable consumer electronics, network PCs, minicomputers, mainframe computers, distributed computing environments that include any of the above systems or devices, and the like.

An exemplary image classifier may be described in the general context of computer-executable instructions, such as program modules, being executed by a computer. Generally, program modules include routines, programs, objects, components, data structures, etc. that perform particular tasks or implement particular abstract data types. An exemplary image classifier may also be practiced in distributed computing environments where tasks are performed by remote processing devices that are linked through a communications network. In a distributed computing environment, program modules may be located in both local and remote computer storage media including memory storage devices.

As shown in FIG. 5, the computing environment 920 includes a general-purpose computing device in the form of a computer 930. The components of computer 920 may include, by are not limited to, one or more processors or processing units 932, a system memory 934, and a bus 936 that couples various system components including the system memory 934 to the processor 932.

Bus 936 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus also known as Mezzanine bus.

Computer 930 typically includes a variety of computer readable media. Such media may be any available media that is accessible by computer 930, and it includes both volatile and non-volatile media, removable and non-removable media.

In FIG. 5, the system memory includes computer readable media in the form of volatile memory, such as random access memory (RAM) 940, and/or non-volatile memory, such as read only memory (ROM) 938. A basic input/output system (BIOS) 942, containing the basic routines that help to transfer information between elements within computer 930, such as during start-up, is stored in ROM 938. RAM 940 typically contains data and/or program modules that are immediately accessible to and/or presently be operated on by processor 932.

Computer 930 may further include other removable/non-removable, volatile/non-volatile computer storage media. By way of example only, FIG. 5 illustrates a hard disk drive 944 for reading from and writing to a non-removable, non-volatile magnetic media (not shown and typically called a "hard drive"), a magnetic disk drive 946 for reading from and writing to a removable, non-volatile magnetic disk 948 (e.g., a "floppy disk"), and an optical disk drive 950 for reading from or writing to a removable, non-volatile optical disk 952 such as a CD-ROM, DVD-ROM or other optical media. The hard disk drive 944, magnetic disk drive 946, and optical disk drive 950 are each connected to bus 936 by one or more interfaces 954.

The drives and their associated computer-readable media provide nonvolatile storage of computer readable instructions, data structures, program modules, and other data for computer 930. Although the exemplary environment described herein employs a hard disk, a removable magnetic disk 948 and a removable optical disk 952, it should be appreciated by those skilled in the art that other types of computer readable media which can store data that is accessible by a computer, such as magnetic cassettes, flash memory cards, digital video disks, random access memories (RAMs), read only memories (ROM), and the like, may also be used in the exemplary operating environment.

A number of program modules may be stored on the hard disk, magnetic disk 948, optical disk 952, ROM 938, or RAM 940, including, by way of example, and not limitation, an operating system 958, one or more application programs 960, other program modules 962, and program data 964.

Each of such operating system 958, one or more application programs 960, other program modules 962, and program data 964 (or some combination thereof) may include an embodiment of an exemplary image classifier. More specifically, each may include an embodiment of image retriever, hierarchy definer, block analyzer, probabilities determiner, probability combiner, image segment classifier.

A user may enter commands and information into computer 930 through input devices such as keyboard 966 and pointing device 968 (such as a "mouse"). Other input devices (not shown) may include a microphone, joystick, game pad, satellite dish, serial port, scanner, or the like. These and other input devices are connected to the processing unit 932 through a user input interface 970 that is coupled to bus 936, but may be connected by other interface and bus structures, such as a parallel port, game port, or a universal serial bus (USB).

A monitor 972 or other type of display device is also connected to bus 936 via an interface, such as a video adapter 974. In addition to the monitor, personal computers typically include other peripheral output devices (not shown), such as speakers and printers, which may be connected through output peripheral interface 975.

Computer 930 may operate in a networked environment using logical connections to one or more remote computers, such as a remote computer 982. Remote computer 982 may include many or all of the elements and features described herein relative to computer 930.

Logical connections shown in FIG. 5 are a local area network (LAN) 977 and a general wide area network (WAN) 979. Such networking environments are commonplace in offices, enterprise-wide computer networks, intranets, and the Internet.

When used in a LAN networking environment, the computer 930 is connected to LAN 977 via network interface or adapter 986. When used in a WAN networking environment, the computer typically includes a modem 978 or other means for establishing communications over the WAN 979. The modem 978, which may be internal or external, may be connected to the system bus 936 via the user input interface 970 or other appropriate mechanism.

Depicted in FIG. 5, is a specific implementation of a WAN via the Internet. Computer 930 typically includes a modem 978 or other means for establishing communications over the Internet 980. Modem 978, which may be internal or external, is connected to bus 936 via interface 970.

In a networked environment, program modules depicted relative to the personal computer 930, or portions thereof, may be stored in a remote memory storage device. By way of example, and not limitation, FIG. 5 illustrates remote application programs 989 as residing on a memory device of remote computer 982. It will be appreciated that the network connections shown and described are exemplary and other means of establishing a communications link between the computers may be used.

Exemplary Operating Environment

FIG. 5 illustrates an example of a suitable operating environment 920 in which an exemplary image classifier may be implemented. Specifically, the exemplary image classifier(s) described herein is implemented (wholly or in part) by any program module 960-962 and/or operating system 958 in FIG. 5 or a portion thereof.

The operating environment is only an example of a suitable operating environment and is not intended to suggest any limitation as to the scope or use of functionality of the exemplary image classifier(s) described herein. Other well known computing systems, environments, and/or configurations that may be suitable for use with an exemplary image classifier include, but are not limited to, personal computers (PCs), server computers, hand-held or laptop devices, multiprocessor systems, microprocessor-based systems, programmable consumer electronics, wireless phones and equipments, general- and special-purpose appliances, application-specific integrated circuits (ASICs), network PCs, minicomputers, mainframe computers, distributed computing environments that include any of the above systems or devices, and the like.

Computer-Executable Instructions

An implementation of an exemplary image classifier may be described in the general context of computer-executable instructions, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Computer Readable Media

An implementation of an exemplary image classifier may be stored on or transmitted across some form of computer readable media. Computer readable media can be any available media that can be accessed by a computer. By way of example, and not limitation, computer readable media may comprise "computer storage media" and "communications media."

"Computer storage media" include volatile and nonvolatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

"Communication media" typically embodies computer readable instructions, data structures, program modules, or other data in a modulated data signal, such as carrier wave or other transport mechanism. Communication media also includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared, and other wireless media. Combinations of any of the above are also included within the scope of computer readable media.

Conclusion

Although the hierarchical, probabilistic, localized, semantic image classifier has been described in language specific to structural features and/or methodological steps, it is to be understood that the hierarchical, probabilistic, localized, semantic image classifier defined in the appended claims is not necessarily limited to the specific features or steps described. Rather, the specific features and steps are disclosed as preferred forms of implementing the claimed present invention.

The invention claimed is:

1. A method of semantically classifying an image, the method comprising:
  forming a group of hierarchical layered blocks from the image, each block within the group being only partially coextensive with the other blocks of the group;

determining a posterior estimate of class membership of the group of hierarchical layered blocks, the estimate being based upon class likelihoods of the hierarchical layered blocks in the group, such likelihood being conditioned on data extracted from hierarchical layered blocks in the group;

semantically classifying a portion of such image based upon the posterior estimate of class membership conditioned on the data extracted from the group of hierarchical layered blocks local to such portion.

2. A method as recited in claim 1, wherein the determining comprises:

determining an estimated class likelihood of each block in the group of hierarchical layered blocks;

combining the estimated class likelihoods of hierarchical layered blocks in the group into a posterior estimate of semantic class membership.

3. A method as recited in claim 1, wherein the determining comprises extracting low level features from blocks.

4. A method as recited in claim 3, wherein the low-level features comprise color and textures.

5. A method as recited in claim 4, wherein the extracting extracts color low-level features by an Ohta decomposition.

6. A method as recited in claim 4, wherein the extracting extracts texture low level features by a complex wavelet transform.

7. A method as recited in claim 1, wherein the class likelihoods are estimated in one-dimensional space.

8. A method as recited in claim 1, wherein a classification that results from the semantically classifying step is binary.

9. A method as recited in claim 1, wherein a classification that results from the semantically classifying step is selected from a group consisting of these binary sets:

sky or not-sky;
grass or not-grass;
natural or man-made;
inside or outside;
hair or not-hair;
face or not-face.

10. An image retrieval method comprising:

a semantic image classification method as recited in claim 1;

searching for images matching a given query in an image library containing images having portions thereof classified using the semantic image classification method.

11. A computer-readable storage medium having computer-executable instructions that, when executed by a computer, performs the method as recited in claim 1.

12. A semantic image classification system, comprising:

a block analyzer configured to extract low-level features of blocks of an image and estimate class likelihoods for each block, a class being a discriminating semantic classification and a block being a portion of the image;

a combiner configured to generate a posterior estimate of class membership based on combining estimated class likelihoods of hierarchical sets of blocks, a hierarchical set of blocks being a hierarchical organized and associated blocks that are only partially coextensive with one another;

an image classifier configured to determine and classify one of multiple discriminating semantic classifications to localized portions of the image based upon the posterior estimate of class membership of blocks comprising such portions.

13. A system as recited in claim 12 further comprising a hierarchy definer configured to subdivide the image into multiple hierarchical sets of blocks, each successively lower layer of a hierarchical set of blocks comprising one or more blocks which are smaller than and at least partially coextensive with one or more blocks in a layer immediately above.

14. A system as recited in claim 12, wherein the low-level features comprise color and textures.

15. A system as recited in claim 14, wherein the block analyzer extracts color low-level features by an Ohta decomposition.

16. A system as recited in claim 14, wherein the block analyzer extracts texture low-level features by a complex wavelet transform.

17. A system as recited in claim 12, wherein the class likelihoods are estimated in one dimensional space.

18. A system as recited in claim 12, wherein the discriminating semantic classifications are selected from a group consisting of these binary sets:

sky or not-sky;
grass or not-grass;
natural or man-made;
inside or outside;
hair or not-hair;
face or not-face.

19. An image retrieval system comprising:

a semantic image classification system as recited in claim 12;

a semantic image querier configured to search for images matching a given query in an image library containing images having portions thereof classified using the semantic image classification system.

20. A computer-readable storage medium having stored thereon a data structure, comprising an image library containing images having portions thereof classified using a semantic image classification system as recited in claim 12.

* * * * *